United States Patent Office 3,169,636
Patented Feb. 16, 1965

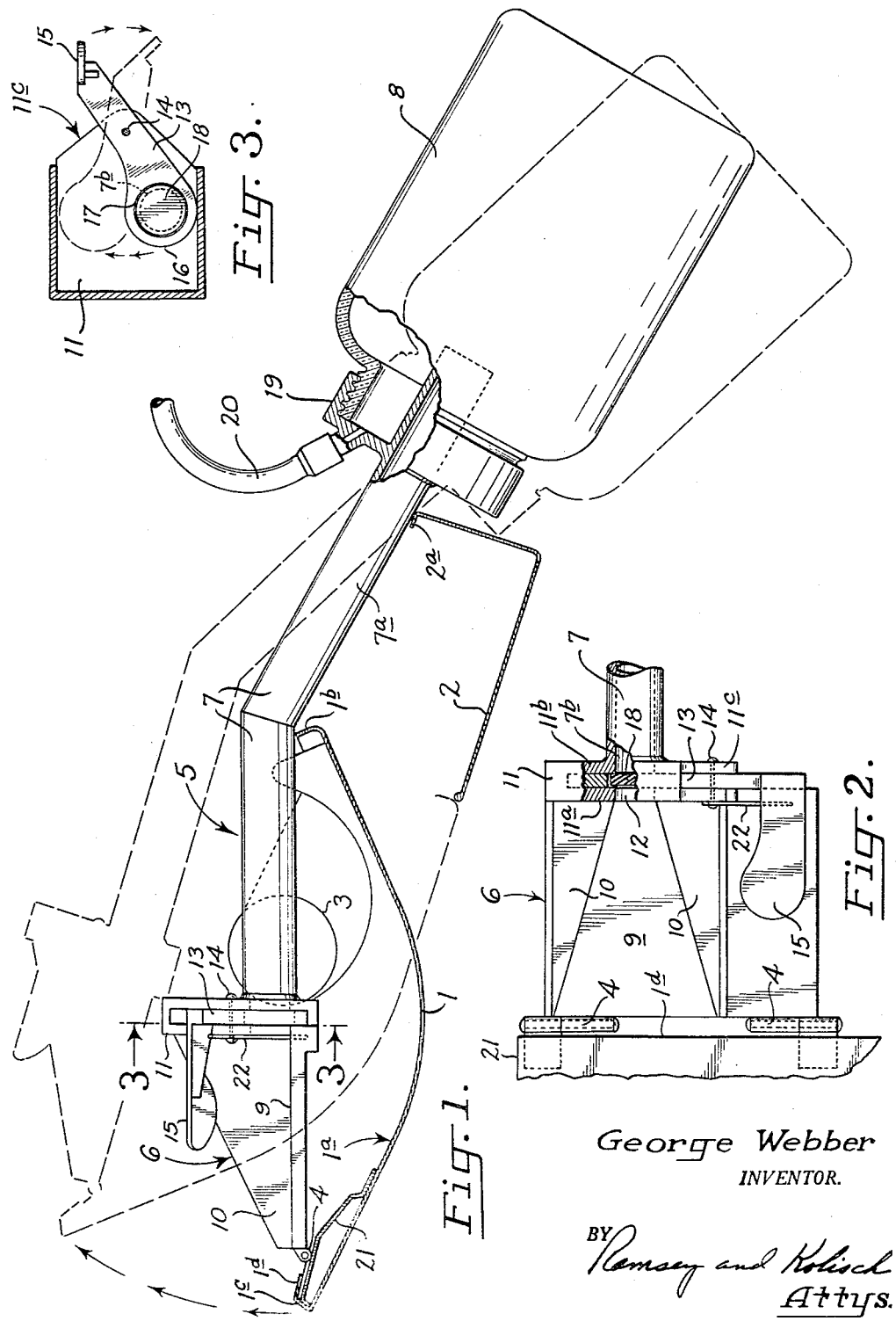

3,169,636
AUTOMOBILE ASH TRAY
George Webber, 1010 NE. Prescott St., Portland 11, Oreg., assignor of one-half to Alfred S. Parkhurst, Portland, Oreg.
Filed May 3, 1960, Ser. No. 26,551
6 Claims. (Cl. 206—19.5)

My invention relates generally to ash trays, especially designed for use with passenger automobiles, which ash trays are adapted to be evacuated by a reduced pressure therein so that the contents may be discharged merely by manipulating a valve. Because of the debris that flows through said ash trays and about the valve mechanism, difficulty has been encountered in maintaining the valve mechanism free from air leakage. The discharge of debris by evacuation is induced by sub-atmospheric pressure developed through a connection with the intake manifold of the automobile engine.

It is esesntial that air flow to the engine be subject to little variation, thus to maintain a more or less constant air-fuel ratio therein. If the valve becomes imperfect in its operation, particularly if it leaks air, it causes air to be sucked through the evacuating conduits and varies the air pressure within the intake manifold. On the other hand, if a too tight seal is maintained within the ash tray, it requires the utilization of substantial force to actuate the valve for said ash tray and conscious effort on the part of the driver of the vehicle is required. I have discovered that both an adequately tight seal may be maintained about the valve for the ash tray, and the expenditure of little force in operating said valve is required, if a free-floating valve disc is incorporated therein.

One of the objects of my invention is to provide a simple form of valve mechanism for an ash tray of this character which utilizes the decreased pressure induced by manifold evacuation to maintain a tight seal in the actuated mechanism for the ash tray.

A further object of my invention is to provide an evacuable ash tray assembly that is short-coupled and may be installed as a self-contained unit in a vehicle, thus eliminating installation time and expense and eliminating further crowding of the instrument panel of an automobile and the areas immediately adjacent said panel.

A further and more specific object of my invention is to provide an evacuable ash tray of this character so that it may be mounted within the ash tray receiver normally provided upon the instrument panel of an automobile.

Other and further details of my invention are hereinafter described with reference to the accompanying drawings in which:

FIG. 1 is a vertical section through one type of vehicle ash tray receiver showing an ash tray assembly embodying my invention incorporated therewith;

FIG. 2 is a plan view of an ash tray assembly incorporating my invention pivotally secured to the ash tray receiver, with portions of said structures shown in section to disclose structural details of the free-floating valve forming a part of my invention; and FIG. 3 is a sectional view taken on the line 3—3 in FIG. 1 illustrating, in dotted outline and arrows, the movement of the valve mechanism and the free-floating valve incorporated therein.

My invention is particularly designed to be incorporated in a vehicle ash receiver, such as is now generally provided as an accessory to passenger automobiles. Said ash tray receivers vary in detail. Most of them are movable to opened and closed position and most of them tip from one position to another. They are normally recessed into the instrument panel of an automobile so that when closed they conceal the ash receiver aperture and when they are opened they are freely accessible to the driver and other occupants of a vehicle.

One type of receiver is illustrated and comprises a basket member 1 pivotally mounted in the instrument panel of an automobile, a portion of which is given reference number 2. Although most ash trays are mounted in the instrument panel of an automobile they are also mounted adjacent passenger seats distant from said instrument panel. The basket member is pivotally mounted upon an axis which lies centrally of a journal member 3, about which the basket member swings, as shown in full and in dotted lines in FIG. 1. There is but one journal member illustrated in FIG. 1, but it is to be understood that another one at the opposite side and alined therewith is normally provided so that the basket member will rotate about a fixed axis.

An ash tray assembly embodying my invention is shown as a self-contained unit, pivotally mounted to the inner face 1a of the basket member by a pair of hinge members 4. The ash tray assembly 5 comprises an ash tray member 6, a conduit 7, and a refuse jar container 8. Frequently, it is difficult to find sufficient room in a standard automobile to accommodate an ash tray assembly within the ash tray receiver and to permit said ash tray receiver to be moved easily and without interference from its closed to its opened position. I have illustrated how this may be done in one installation by causing the conduit to be bent upon an oblique angle to clear the rear edge 1b of the basket member, and to have that portion 7a of the conduit adjacent the refuse jar or container bear upon the upper edge 2a of the portion of the instrument panel identified as 2.

By joining the forward end of the ash tray assembly by hinge members 4 and permitting the conduit to slide upon the upper edge 2a of the instrument panel, the basket member 1 may move without restriction. The instrument panel also sustains the weight of the conduit and the refuse jar or container and the connections from the latter to the intake manifold, and provides a quasi-counterweight for balancing the mass of the ash tray, thus to aid in the manipulation of the basket member and the ash tray assembly mounted therein.

The ash tray member 6 is provided with a bottom 9, side walls 10 and an end wall 11. Preferably the side walls converge, as is shown in FIG. 2, and terminate adjacent aperture 12 in the end wall, so the aperture is alined with the converging sides, as well as with the upper surface of the bottom 9. Thus, if a cigarette is placed endwise into said tray over the front edge 1c of the basket member, it is guided into the aperture without requiring a great deal of conscious effort.

The end wall is made with two spaced sections 11a, 11b and is open at one side 11c. Pivotally mounted between the spaced sections of the end wall is a blade-type valve mechanism 13. Said valve mechanism is elongated, and is pivoted intermediate its ends upon a pin 14 extending through the walls, and extends from the open side 11c of the end wall. The extending end of said valve mechanism terminates at one end in a trigger 15 lying exteriorly of the ash tray member, and terminates at the other end in a rounded closure portion 16. Said rounded closure portion has an eye 17 formed therein in which is lodged a circular floating valve member or disc 18. The blade-type valve mechanism is preferably of uniform width and is plane. Within the planes of the two sides thereof, the valve disc 18 is lodged. Said disc preferably is thinner in section than the blade-type valve mechanism, as is illustrated in FIG. 2. The valve disc also is smaller in diameter than the eye 17 so that it may move freely therein. Said valve disc is of slightly larger diameter than the aperture 12 and the bore 7b of the conduit 7 which is alined with the aperture 12. Thus, the peripheral surface of said valve disc overlies the margins of the aperture and the bore of the conduit and is held against lateral dislodgement.

When the pressure within the conduit is maintained below that of the atmosphere, the atmospheric pressure forces the disc into sealing arrangement with the conduit and prevents air from moving into the conduit through the ash tray. I deem it advisable to maintain the pressure within the conduit at sub-atmospheric pressure at all times when the ash tray assembly is mounted in an automobile and the engine for said vehicle is being actuated. In other words, I have found it desirable to have the conduit in open connection with the intake of the automobile and to have the conduit free of obstruction so that cigarette butts and other debris readily may pass through the bore of the conduit to be discharged into the refuse jar or container 8. Said refuse jar or container preferably is the type having a removable lid or cap 19 screw-threaded to the neck of said refuse jar. Said jar is preferably made of metal or other material resistant to breakage. It preferably has substantial capacity and is readily detachable from its cap so that the contents may be dumped out. A flexible tube 20 joins the interior of the jar with the intake manifold of the engine (not shown).

Most ash tray receivers have basket members with fronts provided with an inturned lip 1d for mounting the usual non-evacuated type ash tray. I provide a slide 21 to be placed on the inner face of the basket member, and the forward end of the ash tray assembly is mounted in place by fitting hinge members 4 between the slide and lip 1d. The fit between said slide 21 and said inturned lip 1d is sufficient to prevent the ash tray assembly from becoming detached inadvertently.

My ash tray assembly is mounted in the following manner:

If the basket member has an ash tray of standard type mounted therein, the latter may be removed and the slide 21 pushed beneath the inturned lip 1d with the conduit extending over the rear edge of said basket member and bearing upon the edge 2a of the instrument panel. The flexible tube 20 may be joined by a nipple or otherwise to the intake manifold. The ash tray receiver may be opened by moving the basket downwardly to the position shown in full lines in FIG. 1, and it may be closed by moving it upwardly to the position indicated in dotted outline and in the direction of the arrows, shown in FIG. 1. This causes the basket member and the ash tray assembly to tip about an axis which is centrally disposed with relation to journal members 3. When the ash tray is to be used the basket member is pulled to the position shown in full lines.

If a cigarette butt is to be snuffed out and discharged from the ash tray it is laid in the ash tray with one end adjacent the aperture 12. The trigger 15 may be pushed down, as is indicated in dotted outline in FIG. 3, so that the blade-type valve mechanism is rotated clockwise. This moves the valve disc 18 out of registration with aperture 12 and from overlying relation with the bore of conduit 7. The cigarette moves endwise instantly through the conduit and is deposited within the refuse jar 8. The blade-type valve mechanism is urged to its closed position by means of a spring 22. In its closed position the disc is located in registry with the bore of the conduit because the eyed end 17 of the blade-type valve mechanism 13 moves into abutment with the floor of the tray, as is illustrated in FIG. 3. Said spring 22 has sufficient bias to hold the parts in this position and the bias of the spring is augmented by the suction imposed upon one face of the valve disc 18 that faces the bore of conduit 7.

The refuse jar or container 8 is accessible by lifting the hood of the automobile and the contents readily may be discharged by unscrewing the jar or container from its cap, placing the refuse in a proper container, and then screw fitting the jar to its cap. Inasmuch as the flexible tube 20 is joined to the cap, the removal of the container does not affect any of the air connections for the ash tray assembly.

The mass of the ash tray assembly is so proportioned that the weight of the refuse jar and its connections is slightly greater than the remainder thereof with respect to the point of support upon the edge 2a of the instrument panel. This tends to cause the ash tray assembly to rest upon said edge without involving rattling. That is to say, the hinge connection at 4 tends to be rotated clockwise by the preponderance of the mass to the right of the edge 2a. This disposition of mass is not essential, but I have found it to be desirable.

It is claimed and desired to secure by Letters Patent:

1. In combination with an ash tray having a discharge aperture in a wall thereof and a conduit connecting with the interior of said ash tray through said aperture, with said conduit adapted to be maintained at subatmospheric pressure, a valve mechanism comprising a reciprocating blade member movable transversely of said aperture and a free-floating valve disc, said valve mechanism being movable to two positions, one operatively covering said discharge aperture and another uncovering said aperture, and means for moving said valve mechanism selectively to either of said two positions, said free-floating valve disc in said valve mechanism registering with the discharge aperture when the valve mechanism is in covering position and being freely responsive to pressure changes in said conduit to promote sealing of said aperture, said free-floating valve disc conforming generally in area with the cross section of said aperture and being loosely mounted in the blade member.

2. In combination with an adjustable ash tray receiver for a vehicle, said ash tray receiver being adjustably mounted on the instrument panel of a vehicle and being movable between a closed position where the receiver is substantially flush with the instrument panel and an an opened position where the receiver is positioned forwardly of the instrument panel, an ash tray member housed within said ash tray receiver having an aperture communicating with the interior of the ash tray member adjacent its base, a conduit fixed to and communicating with the interior of said ash tray member through said aperture with the interior of said conduit and said aperture defining a passage for the removal of material from said ash tray member, means for reducing the pressure within said conduit to subatmospheric, and valve mechanism for opening and closing said passage, said valve mechanism including means for operating it arranged exteriorally of said ash tray member, said valve mechanism and said means for actuating it being housed within said ash tray receiver together with said ash tray member, said ash tray member and said means for actuating said valve mechanism being shiftable to a position where they are both exposed on movement of said ash tray receiver to its opened position and being covered by the ash tray receiver with the latter in its closed position.

3. In combination with an adjustable ash tray receiver for a vehicle, said ash tray receiver being adjustably mounted adjacent a fixed portion of the vehicle for movement between opened and closed positions, an ash tray member housed within said ash tray receiver having an aperture communicating with the interior of the ash tray member adjacent its base, a rigid conduit fixed to and communicating with the interior of said ash tray member through said aperture with the interior of said conduit and said aperture defining a passage for the removal of material from said ash tray member, means for reducing the pressure within said conduit to subatmospheric including a collecting container rigidly joined to said conduit and thus fixed to the ash tray member through said conduit, and valve mechanism for opening and closing said passage, said valve mechanism including means for operating it arranged exteriorally of said ash tray member, said valve mechanism and said means for actuating it being housed within said ash tray receiver together with said ash tray member, said ash tray member and said means for actuating said valve mechanism being shiftable to a position where they are both exposed on movement of said ash tray receiver to its opened position and being covered by the ash tray reeciver with the latter in its closed position.

4. In an ash tray having a vacuum conduit connecting with the interior thereof and defining a passage for the removal of debris from the ash tray, valve mechanism for closing off said passage comprising a blade member extending transversely of said passage, the walls of the ash tray member defining a restricted encompassing way intersecting the passage, said blade member being movably mounted in said way, an opening in said blade member registering with said passage, a free-floating valve disc loosely mounted in the opening of said blade member and disposed substantially normal to said passage when the blade member is in a position closing it off.

5. In an evacuatable ash tray,
   a wall for the ash tray comprising laterally spaced inner and outer wall sections mounted with a space between the wall sections,
   discharge apertures in said inner and outer wall sections defining a passage for the flow of air from the ash tray out through said wall,
   a vacuum conduit connected to said wall of the ash tray operable to draw air through said apertures, and
   valve mechanism movable to two positions, one operatively covering the discharge aperture in said outer wall section and another uncovering said aperture,
   said valve mechanism comprising a reciprocating blade member including a closure portion disposed in the space between said wall sections which is movable transversely of said apertures, and a free-floating valve disc mounted on said closure portion of said blade member having a thickness which is less than the thickness of said closure portion,
   said free-floating valve disc registering with said discharge aperture in said outer wall section when said valve mechanism is in its position covering said aperture,
   said disc being loosely mounted in said closure portion of the blade member and being freely responsive to pressure changes in said conduit to promote sealing of said aperture in said outer wall section.

6. In combination with an adjustable ash tray receiver for a vehicle,
   said ash tray receiver having a closed position where it is substantially flush with the instrument panel of a vehicle, and an opened position where the receiver is spaced forwardly of said instrument panel,
   an ash tray member housed within said ash tray receiver having an aperture adjacent its base communicating with the interior of the ash tray member,
   a rigid conduit affixed at one end to said ash tray member with the interior thereof communicating with the interior of the ash tray member through said aperture and providing a passage for the flow of air from the interior of the ash tray member,
   a container for collecting debris rigidly connected to the end of said conduit opposite its said one end,
   means for reducing the pressure within the conduit to subatmospheric pressure,
   valve mechanism for opening and closing said passage including means for operating the valve mechanism arranged exteriorally of the ash tray member,
   said valve mechanism and said means for actuating it being housed within said ash tray receiver together with said ash tray member,
   means mounting said ash tray member on said receiver whereby said ash tray member and the conduit connected to it are shifted together with said receiver on movement of the receiver from its closed to its open position, and
   a fixed support for said conduit engaging said conduit at a point intermediate its ends and accommodating relative movement of the conduit.

References Cited by the Examiner
UNITED STATES PATENTS

| | | | |
|---|---|---|---|
| 2,461,815 | 2/49 | Gill | 206—19.5 |
| 2,556,370 | 6/51 | Holmes | 206—19.5 |
| 2,561,275 | 7/51 | Hentschel | 206—19.5 |
| 2,716,464 | 8/55 | Weisbecker | 206—19.5 |
| 2,764,281 | 9/56 | Mendenhall | 206—19.5 |
| 2,828,937 | 4/58 | Kreitchman | 251—175 |
| 2,874,702 | 2/59 | Walker et al. | 206—19.5 |
| 2,891,662 | 6/59 | Frost | 206—19 |
| 2,851,156 | 9/58 | Thompson | 206—19 |

FOREIGN PATENTS 891,811   10/53   Germany.

THERON E. CONDON, *Primary Examiner.*

FRANKLIN T. GARRETT, EARLE J. DRUMMOND, GEORGE O. RALSTON, *Examiners.*